United States Patent [19]

Brayton

[11] 4,177,448

[45] Dec. 4, 1979

[54] CHARACTER RECOGNITION SYSTEM AND METHOD MULTI-BIT CURVE VECTOR PROCESSING

[75] Inventor: Robert K. Brayton, Briarcliff Manor, N.Y.

[73] Assignee: International Business Machines Corporation, Armonk, N.Y.

[21] Appl. No.: 919,535

[22] Filed: Jun. 26, 1978

[51] Int. Cl.² .......................... G06K 9/00; G06K 9/16
[52] U.S. Cl. .................... 340/146.3 AE; 340/146.3 D
[58] Field of Search ........... 340/146.3 AE, 146.3 AC, 340/146.3 AQ, 146.3 D, 146.3 Q, 146.3 T

[56] References Cited

U.S. PATENT DOCUMENTS

| | | | |
|---|---|---|---|
| 3,601,803 | 8/1971 | Ullmann | 340/146.3 AQ |
| 3,813,646 | 5/1974 | Quarmby | 340/146.3 AE |
| 3,979,722 | 9/1976 | Sakoe | 340/146.3 AE |
| 4,014,000 | 3/1977 | Uno et al. | 340/146.3 Q |

Primary Examiner—Joseph M. Thesz
Attorney, Agent, or Firm—John J. Goodwin

[57] ABSTRACT

An automatic character recognition system and method for identifying an unknown character which is one of a class of known characters. The system is set up using known specimen characters from a large character training set which must first be selected based on the use to which the character recognition will be put. Using the selected set, features and shapes of the character vocabulary in the set are obtained using selected feature scan parameters, are processed as a plurality of representative and normalized pieces of curves and are then stored in the form of binary coded representations. The system set-up also includes selecting and storing canonic shape parameters. The canonic shapes are separate pieces or segments of lines and curves which are selected on the basis that their shapes can be found as component parts or within a significant number of the characters within the character set. Having selected a character training set, selected and stored feature scan parameters and selected and stored canonic shape parameters, the system set-up procedure is completed. The next procedure is referred to as "system training" in which the individual characters within the large character training set are processed with the prior knowledge of the identity of each character being processed. This consists of an individual curve following for each of the plurality of characters on the character set and recording the path coordinates resulting from the curve following operation. The path coordinates are matched against the stored canonic shape parameters and the "best match" features are encoded. Statistical tables are then formed based on the best match relationships between the known training characters and the canonic shapes. The character recognition system is now capable of hereinafter operating with and identifying unknown characters belonging to the recognition space character set. In this procedure, the unknown character is examined using feature scan parameters to extract the features from the unknown character, providing complex vectors of the measured path coordinates of the extracted features which are matched against the stored canonic shape parameters by computing complex inner products, and a best match feature is determined.

Finally, a plurality of row vectors are extracted from the statistical tables and combined to form a product vector. The largest component of the product vector is selected, and the column index j of the maximum component is noted. The unknown character is then identified as being a member of the character membership class whose column index is j.

10 Claims, 12 Drawing Figures

FIG. 5

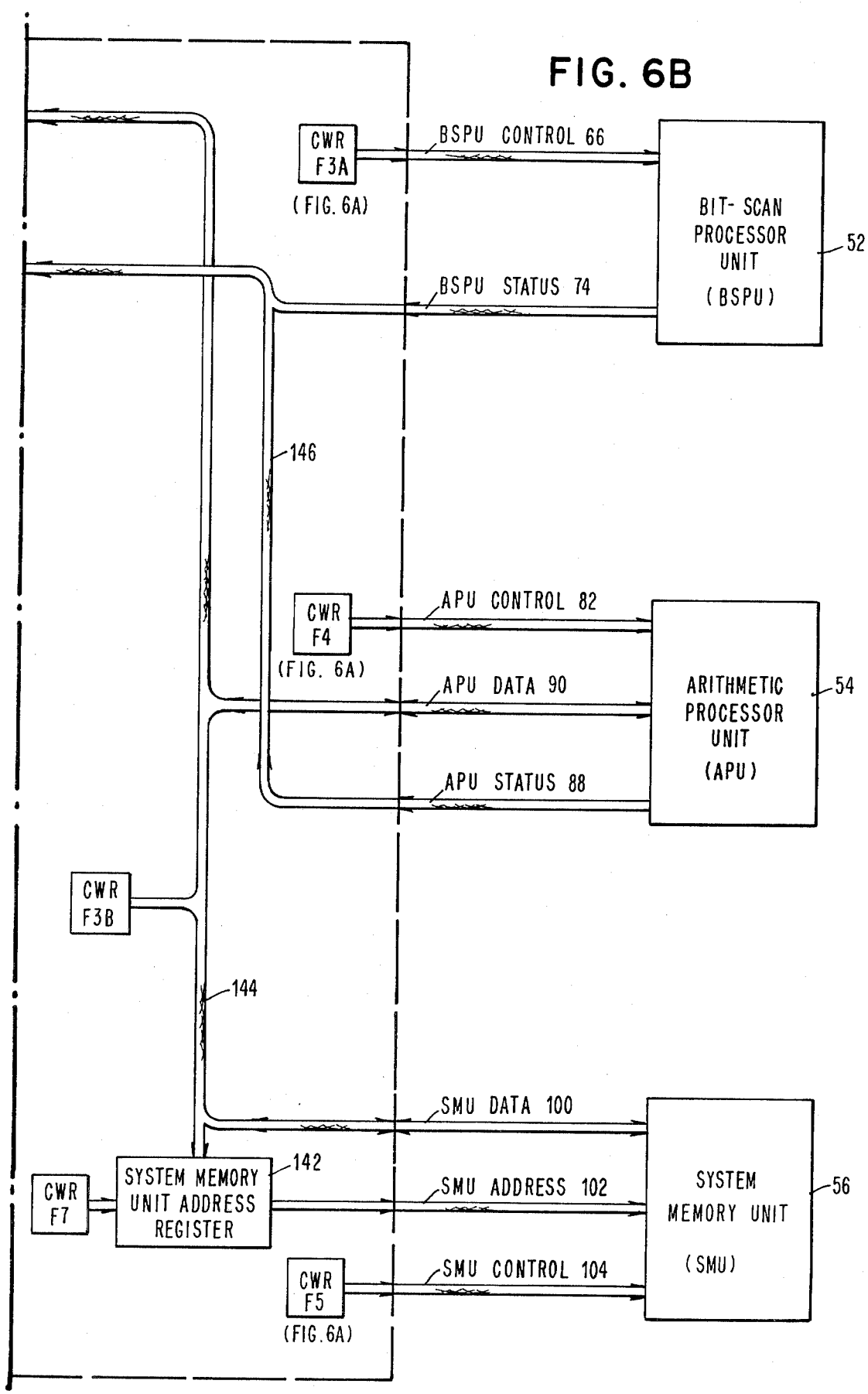

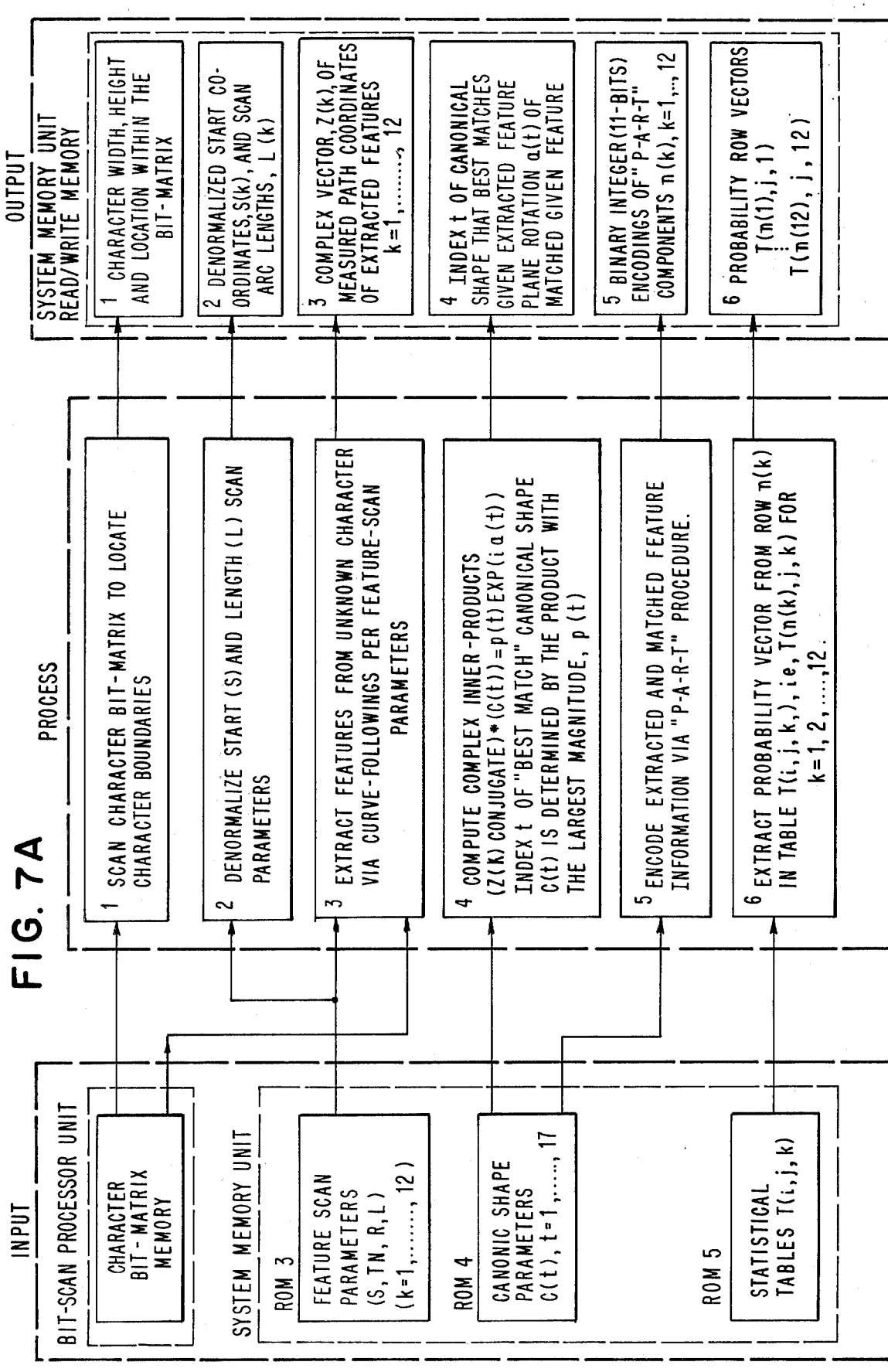
FIG. 7A PROCESS

| LEGEND | |
|---|---|
| i = ROW INDEX | 11 BIT FEATURE ENCODING |
| j = COLUMN INDEX | CHARACTER MEMBERSHIP CLASS |
| k = PLANE INDEX | FEATURE SCAN TYPE |

CHARACTER RECOGNITION SYSTEM AND METHOD MULTI-BIT CURVE VECTOR PROCESSING

DESCRIPTION

1. Technical Field

The present invention relates to the field of optical recognition systems and methods and more particularly to a character recognition system wherein a scanning system provides a digitized character format, a series of segment scans are performed on each character, each segment scan providing a plurality of data patterns characteristic of the segment and the segment data characteristics are compared with a predetermined number of characteristic forms and a unique characteristic is produced utilizing this information and ultimately the characteristics are compared with a set of references to make a final correlation to determine the character identity.

2. Background Art

In prior character recognition systems based on curve following, character feature measurements are performed wherein a feature result is a "0" or a "1", that is, a "no" or "yes" indication whether a particular feature is absent or present.

If the feature being investigated is absent, and the feature result is "0" or "no", then there is no further attempt to describe what was being investigated and the information is discarded.

The present invention differs from the prior art in that a character is scanned using a set of four basic scan parameters elements. By changing the values of one or more of the four scan parameter elements a plurality of sets of scan parameters is provided and a character is scanned a plurality of times, once for each different set of scan parameters.

For any one scan of a character using one selected set of scan parameters a complex vector is produced and a complex inner product is performed for the complex vector and each of a plurality of preselected canonic shapes to produce a plurality of complex numbers, one for each complex inner product performed.

The complex number having the largest magnitude is selected and an encoded record is made including certain angular information. The encoded information which results is a multi-bit word containing unique information for the character based on the selected set of scan parameters used. The process is repeated for each of the other ones of the plurality of the aforesaid encoded multi-bit words. This plurality of encoded multi-bit words is used as the basis for identifying an unknown character.

Thus, the present invention which employs this distinct provision and use of feature extraction, encoding and other subsequent processing is different from the prior art known heretofore.

BRIEF DESCRIPTION OF DRAWINGS

FIG. 5 is a schematic block diagram of the structure of the system memory unit of the character recognition system of the present invention.

FIGS. 6A and 6B, when combined according to FIG. 6 provide a schematic block diagram of the structure of the control unit of the character recognition system of the present invention.

FIGS. 7A and 7B, when combined according to FIG. 7, provide a block diagram of the operation of the character recognition system of the present invention.

DISCLOSURE OF INVENTION

Figure 1:
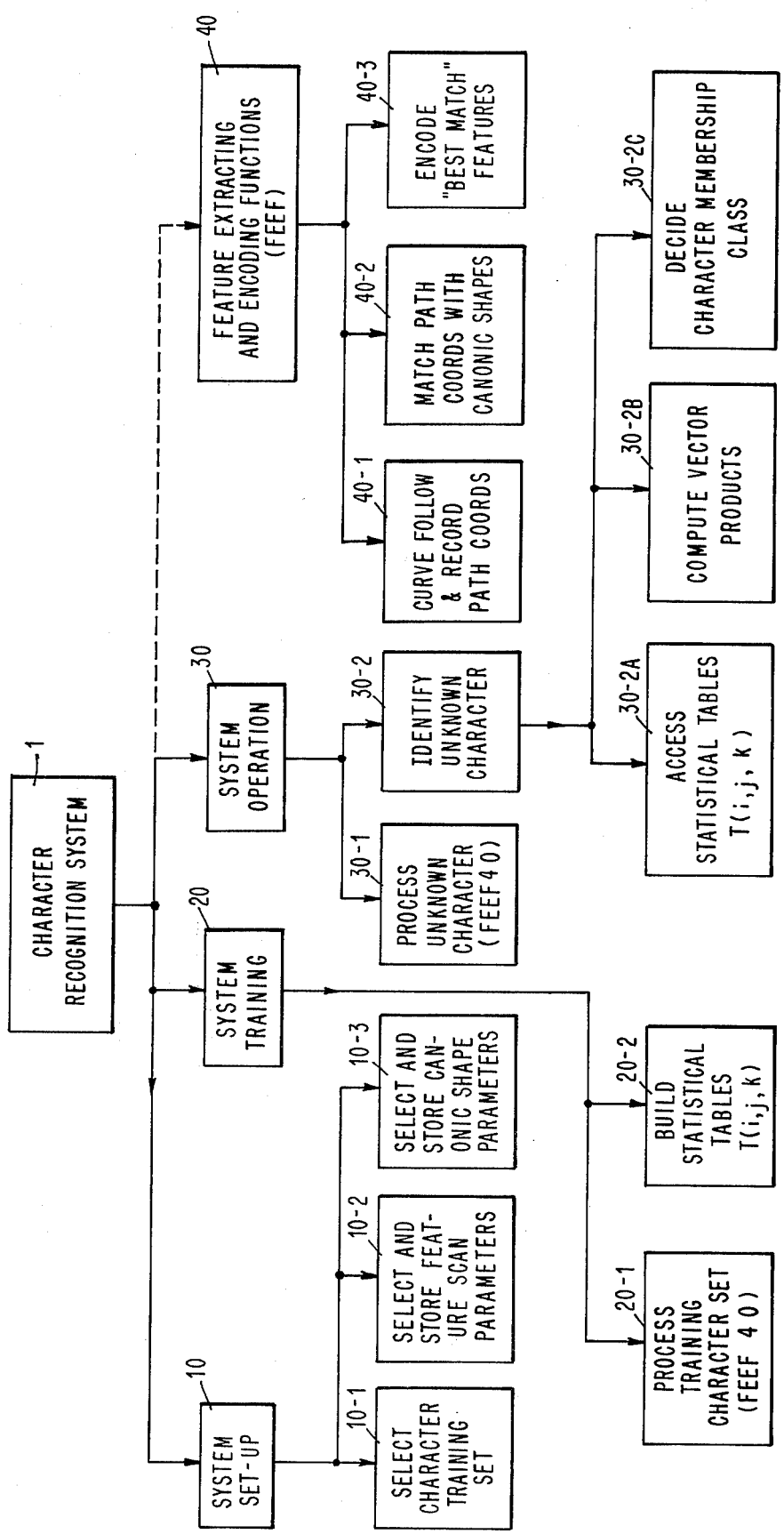
FIG. 1 is a system block diagram of the functions performed by the character recognition system of the present invention.

An object of the present invention is to provide apparatus and methods for recognizing characters which have been scanned and converted into digitized format wherein a first plurality of curve following scans are performed which develop a plurality of unique binary encoded features dependent on the curve segment encountered. The binary encoded features generated from the performed scans are matched against a plurality of binary encoded patterns of standard canonic curve segments and comparative information about the performed scans is determined relative to the standard canonic curve segments scans dependent upon the shapes of the scans, the starting points of the scans, and angular displacements and lengths of the scans. A plurality of high information data words are accumulated characterizing each of the plurality of performed scans for each character, and a final correlation operation is performed to determine which of a set of standard characters the scanned character represents.

Another object of the present invention is to provide apparatus and means for developing multi-bit vectors containing information concerning the nature of the curve sections followed.

The embodiment of the character recognition system illustrated in FIGS. 1–9 has been designed to operate with a set of handwritten characters, for example, a set of ten numerals from 0 to 9, however the methods and apparatus set forth in the recognition process are not restricted to numbers and may also be used on a larger and different character set such as alphabetic or other type characters. However, the present invention is not restricted to any particular format and may be used with any set of different shaped characters. A general explanation of the principles of the invention follows hereinbelow, and will be followed by a description of an embodiment illustrated in the figures.

The character recognition system is first set up using known specimen characters from a large character training set which must first be selected based on the use to which the character recognition will be put. For example, a character training set may be several thousand handwriting specimens existing and compiled from a source such as motor vehicle documents, army or navy records, social security records, or any other existing character set with which the character recognition system will be used. The large character set is needed for the formation of statistical tables which will be later described.

Using the selected character set, the features and shapes of the character vocabulary in the set, which in the present embodiment are the characters 0 through 9 but which may also be alphabet letters A through Z etc., are obtained and processed as a plurality of representative and normalized pieces of curves and are then stored in the form of binary coded representations.

Initially, every character of the character set is converted into a binary matrix of "1"s and "0"s in storage where the "1"s represent the black portions and the "0"s represent the white portions of each character. The binary matrix within which the characters are represented is referred to as the character bit-matrix.

In the set-up mode, feature scan parameters are also selected and stored. In the feature scan parameter selection a general scan function is used which includes four elements entitled Start Position (S), Transition Number (TN), Length (L) and Rotation (R). When values for S, TN, L and R are assigned, one scan function is specified. When the values for S, TN, L and R are changed, a different scan function is specified. In the present embodiment twelve different scan functions are used, each being distinct from the others by the value assigned to at least one of the S, TN, L or R elements.

The Start Position S is defined and specified as a particular position around the four sides of the border of the aforesaid binary matrix containing a character. For example, one selected Start Position S may be one-third the distance down from the top of the left side of the matrix. In such example the initial scan direction is horizontally into the matrix from left to right from the Start Position S. If, as another example, the Start Position S is at the middle of the bottom side of the matrix border, then the initial scan direction is vertically upwards from the Start Position S. As the scan takes place from the Start Position, white or "0" bits will be encountered until the first piece of the stored character is detected as a black or "1" bit.

Transition Number TN is employed when the first black bit of the character is encountered as just described. The TN is used to begin the curve following process. There are two possible values of TN used in the present embodiment. An assigned TN of one directs the system to begin curve following after a scan transition from a white bit to a black bit and an assigned TN of two directs the system to begin curve following after a scan transition from a white bit to a black bit to a white bit. In other words for a TN of one the curve following will begin when the first edge or side of a character curve segment is encountered and for a TN of two the curve following will begin when the scan passes over the width of the character curve segment and leaves the other edge or side of the segment.

After the selected TN has been satisfied, the actual scan of the character begins and the Rotation element R is used. As the curve segment of a character is followed, the curve following can be performed either by keeping a black bit (the character indicia) on the right side and a white bit on the left side of the follower, or by keeping a white bit on the right side and a black bit on the left side. Thus there are two values of R which may be assigned which are indicated by a "1" bit specifying "black on right" or a "0" bit specifying "black on left".

The selection of one or the other value of R naturally determines (along with the transition number followed.

The fourth element of a feature scan parameter is L and represents the length of a scan segment, that is, the distance that a particular character curve segment will be followed or scanned before a new feature scan parameter having different values of one or more of the S, TN, R and L elements is used. The values of L for each feature scan parameter may and usually differ from each other, however, every L value is divided in eight equal parts thereby providing eight points along the character segment which together with the starting point of L provide nine x,y coordinate points along the character segment to produce nine complex numbers designated $$Z = (x_1 + i\,y_1, \ldots, x_9 + i\,y_9)$$

where $(x_i, y_i)$ are nine equally spaced points along the character curve segment.

In the present embodiment twelve different sets of feature scan parameters are used. The twelve different sets of the four elements, S, TN, L and R will, in general, yield twelve distinct complex vectors $Z(1), \ldots, Z(12)$ when an unknown character is scanned.

In addition to selecting a character training set and selecting and storing feature scan parameters, the system set-up also includes the procedure of selecting and storing canonic shape parameters. The canonic shapes are separate pieces or segments of lines and curves which are selected on the basis that their shapes can be found as component parts or within a significant number of the characters within the character set.

Typical examples of canonic shape parameters which may be used in the present embodiment are illustrated as follows:

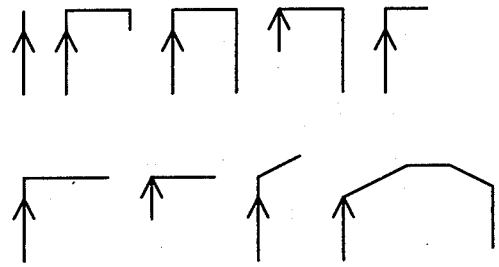

The illustrated nine shapes, along with the conjugates of the second through ninth shapes, provide a set of seventeen selected canonic shapes which are later matched against the character curve segments of the character being scanned so that a "best match" can be determined and used in the recognition process of the present invention.

The parameters of each of the selected canonic shapes and their conjugates, for example those illustrated above, are stored as a complex 9-vector, for example:

$$C^t = (a_1{}^t + i\,b_1{}^t, \ldots, a_9{}^t + i\,b_9{}^t)$$

wherein the superscript "t" an index number and the "t" preceding the "b" is the square root of minus one which designates the "b" as an imaginary numeric quantity.

Having selected a character training set, selected and stored twelve feature scan parameters and selected and stored seventeen canonic shape parameters, the system set-up procedure is completed. The next procedure is referred to as "system training". In the system training procedure the individual characters within the large character training set are processed with the prior knowledge of the identity of each character being processed. This consists of individually curve following each of the plurality of characters in the character set and recording the path coordinates resulting from the curve following operation. The path coordinates are matched against the stored canonic shape parameters and the "best match" features are encoded. The best match features encoding includes encoding the amount of rotation that a character segment may have to undergo in order to match a canonic shape. After these procedures are performed, statistical tables are formed based on the best match relationships between the known training characters and the canonic shapes.

To explain the manner in which the statistical tables are formed, assume that the known character obtained from the character set for one given processing operation is the character "8". This character 8 is scanned twelve times (k=1, k=2, k=3 ... k=12) using the twelve different sets of feature scan parameters.

For the first scan (k=1) the path coordinates are recorded and matched against the seventeen canonic shapes to determine, for example, that the thirteenth canonic shape (indexed in storage as shape number 13) is the best match for the path coordinates of the first scan (k=1). The index number of the canonic shape (i.e., 13) and the rotation angle of the path coordinates to produce the best match condition are encoded into an eleven bit vector. An eleven bit vector has 2048 ($2^{11}$) different decimal values from 0 to 2047.

In storage, a plane is provided for k=1. This plane consists of a column for each different character in the character set. In the present embodiment there are ten columns designated 0 through 9 because the "recognition" character set is being restricted, for purposes of explanation, to the characters 0 through 9. The plane also consists of 2048 rows, designated row 0 through 2047 for each of the possible eleven bit vectors. Row 0 is for a vector containing eleven "0" bits, row 1 for vector 00000000001, row 2 for vector 00000000010, row 3 for vector 00000000011, and so on to row 2047 for the vector with all "1" bits.

Eleven other identical planes are provided in storage for k=2, k=3 ... k=12 so that twelve separate planes are provided, one for each of the twelve feature scans.

Recalling that the first scan using the first set of feature scan parameters produced a best match which provided an eleven bit vector (an encoding of information related to the start position, canonic shape index plus angle) for the known character "8", the row for this eleven bit vector in the first plane in storage (for k=1) and the column in the first plane for the character 8 specify a particular position (cell) in the plane at this row and column address. A "1" is entered into this addressed storage cell (all the cell positions in all the planes initially being occupied by "0"s).

This procedure is repeated for the second feature scan parameter (k=2) using the second storage plane, and so on through the twelve parameter scans and the twelve storage planes.

At the end of the twelve feature scans and associated matching and encoding steps, there will be a "1" bit in each "8" column of the twelve planes at the appropriate row corresponding to the particular eleven bit vector produced by the scan, match and encoding steps.

This entire process is repeated for all the other known characters in the character training set, including other examples of the character "8" and all the other occurrences of the other characters in the set. Each time a cell in a row and column of one of the twelve planes is designated, the stored the cell is incremented by one, so that at the end of the procedure there will be large number values in the cells within the twelve storage planes. The final step in the procedure involves normalizing the values of the cells. This is accomplished by calculating the sum of the values in the cells across a row in a plane and dividing the value in each cell by the sum. This procedure normalizes the row sums to unity.

The contents of the aforesaid twelve planes are the statistical tables $T(i,j,k)$ where i is the number of the row (the i-th row ranging from 0 to 2047 in the present embodiment), j is the number of the column (the jth column ranging from 0 to 9 in the present embodiment), and k is the number of the plane (the k-th plane ranging from 1 to 12 in the present embodiment).

This completes the system training operation, wherein the known characters within the selected character training set were curve followed, matched with the selected canonic shapes, best match features were encoded and statistical tables were formed. The character recognition system is now capable of hereinafter operating with and identifying unknown characters belonging to the recognition character set, i.e., 0,1,2, ... , 9. The system set-up procedure and the system training procedure are necessary investments in time and processing so that the character recognition system may thereafter function and perform with a very large character set of a given type.

The system operation for identifying unknown characters, after system set-up and system training will now be described. The unknown character is stored in the character bit-matrix and examined to locate the character boundaries. The feature scan parameters (with S and L suitably denormalized) are then used to extract the features from the unknown character via curve following for feature-scan parameter sets k=1 through k=12 where k is the scan index. This operation provides the complex vectors $Z(K)$ of the measured path coordinates of the extracted features. The complex vectors $Z(k)$ are matched against the seventeen stored canonic shape parameters $C(t)$ by computing the complex inner products ($Z(k)$ conjugate) * $(C(t)=p(t)$ EXP $(ia(t))$. The shape index t of the "best match" canonical shape $C(t)$ is determined by the product with the largest magnitude, $p(t)$. The plane rotation $a(t)$ for the best match feature is also determined by this procedure.

The extracted and matched feature information thus provided is encoded via a P-A-R-T procedure. P-A-R-T is an eleven bit vector divided into four parts. The first part P consists of three bits which specify the starting position of the curve following along the character relative to its horizontal or vertical location. The second part A consists of three bits which specify the angle $\theta^i$ between the curve segment and the matched canonical shape, the third part R consists of one bit which indicates whether a canonical shape or its conjugate is the best fit, and the fourth part T consists of four bits which designates the canonical shape which is the best fit or match. There are a total of twelve of these eleven bit vectors (P-A-R-T), one for each separate feature scan used. The first eleven bit vector for (k=1) will specify the related row of the first plane (k=1) and the information in the ten cells of the row are read-out. This is repeated for k=2, k=3 ... k=12 using the remaining storage planes so that the information in twelve different rows (ten cells long) is available. The vector product of the twelve rows is then performed.

The product of first component (i.e., value of the first cell) of each of the twelve row vectors is the first component $P_1$ of the product vector. The product of the second component of each of the twelve row vectors is the second component $P_2$ of the product vector, etc. This results in a total product vector $P=(P_1,P_2,P_3, \ldots P_{10})$.

Finally, the largest component of the product vector, MAX(P), is selected and the column index j of the maximum component is noted. The unknown character is then identified as being a member of the jth character membership class. For example, maximum component of the product vector is in the column of numeral "8", then the unknown character is identified as an "8".

The present invention described above may be embodied or reduced to practice in a number of different ways depending on the desired application. One particular embodiment illustrated in FIGS. 1–9 will be described in detail herein below.

BEST MODE FOR CARRYING OUT THE INVENTION

FIG. 1 is a functional block diagram illustrating the operations perfored in the character recognition system. The most basic operations or functions for the character recognition system 1 are the System Set-up 10, the System Training 20, the System Operation 30 and the Feature Extracting and Encoding Functions (FEEF) 40. The Feature Extracting and Encoding Functions 40 are procedures which are used in both the system training 20 and the system operation 30.

The System Set-up 10 includes three functional components designated as Select Character Training Set 10-1, Select and Store Feature Scan Parameters, and Select and Store Canonic Shape Parameters 10-3.

The System Training 20 operation includes the function Process Training Character Set 20-1 procedure which uses the Feature . Extracting and Encoding Functions 40. The Feature Extracting and Encoding Functions (FEEF) 40 include the functions of Curve Follow and Record Path Coordinates 40-1, Match Path Coordinates with Canonic Shapes 40-2, and Encode "Best" Match Features 40-3. In the Process Training Character Set 20-1, the functions 40-1, 40-2 and 40-3 of FEEF 40 are performed on a known selected training character set. The System Training 20 procedure also includes the Build Statistical Tables function 20-2 which forms a set of statistical tables, $T(i,j,k)$.

The System Operation 30 includes the function entitled Process Unknown Character 30-1 which is actually the three functions 40-1, 40-2, and 40-3 of FEEF 40 performed on an unknown character. The next function, Identify Unknown Character 30-2, includes the function entitled Access Statistical Tables 30-2A which employs the tables $T(i,j,k)$ formed in 20-2. Then the Compute Vector Products function 30-2B is performed followed by the Decide Character Membership Class function 30-2C.

The fact that the four basic functions in FIG. 1 are designated as 10, 20, 30 and 40 does not mean that the functions or operations described therein operate in a time sequence following this order of reference numbering.

FIG. 1, therefore, is a functional block diagram illustrating the procedures which are carried out by the character recognition system of the present invention.

More particularly the Character Recognition System 1 must be initially instituted by the System Set-up function 10 wherein a prior existing set of known characters is selected from the environment with which the character recognition system is to be used (i.e., Social Security Administration records, etc.). This character set is introduced into the system by the Select Character Training set function 10-1. Feature scan parameters are selected and stored by function 10-2 and canonic shape parameters are selected and stored by function 10-3. Feature scan parameters S, TN, L and R and canonic shapes have been previously described.

Then, in the System Training function 20 training characters which are obtained from the character set selected in 10-1 are processed by function 20-1 by using the FEEF 40 routines 40-1, 40-2 and 40-3. In the FEEF 40 procedure a procedure for curve following and recording the coordinates of the path of the followed curve is performed (40-1). The curve following function 40-1 uses the feature scan parameters selected in function 10-2. The recorded path coordinates are matched stored canonic shapes in function 40-2, said shapes being obtained from storage and having previously been selected in function 10-3, and then the "best" match features are encoded in function 40-3. Based on this operation, a set of statistical tables $T(i,j,k)$ is built for the training characters by function 20-2.

Figure 2:
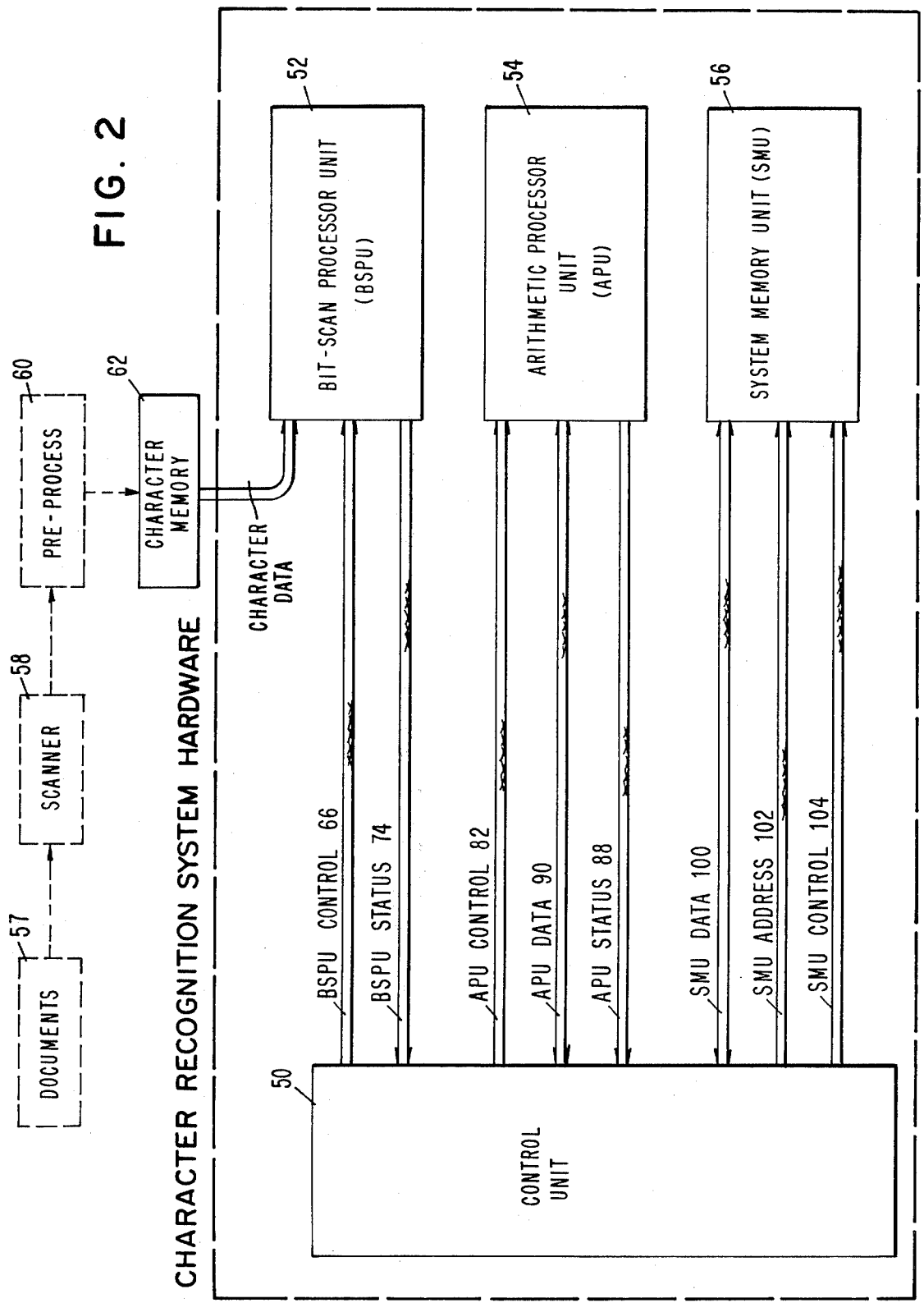
FIG. 2 is a schematic block diagram of the structure of the character recognition system of the present invention.

After the system set-up and system training has taken place, the Character Recognition System 1 is prepared to process and identify unknown characters of the character set in the System Operation function 30. An unknown character is processed in function 30-1 by performing the routines 40-1, 40-2 and 40-3 of the FEEF procedure 40 which in turn employ the feature scan and canonic shape data selected in the System Set-up function 10 thereby producing encoded feature informatics. After the unknown character is processed in function 30-1 the unknown character is identified in function 30-2 by means of the functions 30-2A wherein the statistical tables $T(i,j,k)$ created by function 20-2 are accessed by means of said encoded feature information, vector products are computed by function 30-2B, and then the membership class of the unknown character is decided by function 30-2C. FIG. 2 is a schematic block diagram of a hardware embodiment of a character recognition system according to the present invention. The system includes a control unit 50, a bit-scan processor unit (BSPU) 52, an arithmetic processor unit (APU) 54 and a system memory unit (SMU) 56. Documents, represented by block 57 are scanned by a suitable scanner 58, for example an optical scanner, of a type available in the art. The scanned information is preprocessed into matrix form (column and row) by block 60 and is then entered into character memory means 62 in the form of digital signals representative of "black" and "white" character increments in the rows and columns of the matrix, which for purposes of explanation will be selected as sixty-four rows and sixty-four columns within character memory means 62 which itself is a large memory capable of storing many characters.

There are many examples of devices in the prior art which can be used in the present invention by one skilled in the art to provide the scanner 58, preprocessor 60 and character memory 62, therefore, the specific details of these equipments will not be described in detail. Examples of a scanner, preprocessor and memory unit which can be employed for the purposes required in the present invention can be found in the text OPTICAL CHARACTER RECOGNITION, Fischer, Pollock, Radach and Stevens, copyright 1962 by Spartan Books, Library of Congress Card Number 52-20445. Also, devices such as the IBM 1275 Optical Character Reader, the IBM 1287 Model 2 Optical Character Reader and the IBM 1288 Optical Page Reader have been commercially available.

U.S. Pat. Nos. 3,229,100, 3,248,699, and 3,500,325 also relate to curve following and processing.

Figure 3:
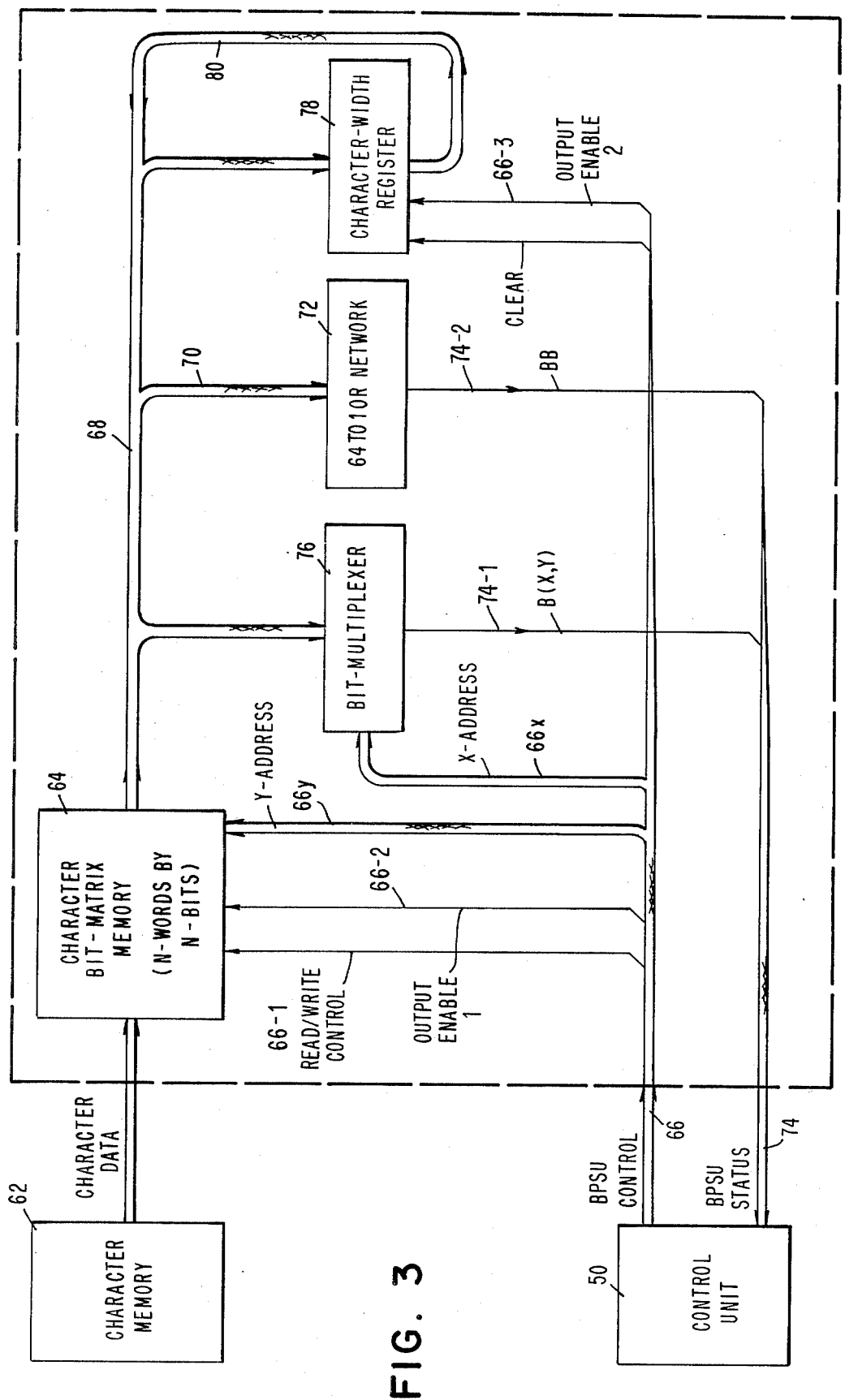
FIG. 3 is a schematic block diagram of the structure of the bit-scan processor unit of the character recognition system of the present invention.

The character information stored in character memory means 62 is entered into the bit-scan processor unit (BSPU) 52 which is shown in more detail in FIG. 3. Referring to FIG. 3, the BSPU 52 stores the scanned character in a N-words (rows) by N-bits (columns) matrix memory 64 where N is selected as sixty-four in the present example and the 4096 bit positions are referred to as having either a "black" or "white" bit stored therein.

Any row of matrix memory 64 and any bit within any row of matrix memory 64 can be selected by means of a six-bit y-address signal and a six-bit X address signal on cable 66. The y-address is applied via cable section 66y to matrix memory 64 which selects a designated row. The selected sixty-four bit row is transferred via cable 68 to a bit-multiplexer 76. The x-address signal is applied via cable section 66x to bit multiplexer 76 to select a desired bit position of the previously selected row. The resultant output B(x,y) from bit-multiplexer 76 is the signal stored at the selected bit position whose coordinates are x and y of the address and is transmitted to control unit 50 via line 74-1 of cable 74 to provide a status signal, to be later described.

The character to be processed is obtained from the character memory 62 and is stored as an array of bits (black and white) within the 4096 bit matrix memory 64 having sixty-four columns and sixty-four rows. In addition to the identity of the character, it is also not known whether the character fills the entire matrix, or whether it is smaller in size and occupies the lower right hand area of the matrix, for example. The first step in the process is to determine the character boundaries, that is, the extreme top and bottom and the left and right black bits so as to provide an indication of character size and its position within the matrix.

As previously discussed, the character recognition process in the system of the present invention employs feature scan parameters which include four elements: START (S), LENGTH (L), TRANSITION NUMBER (TN) and ROTATION (R). These four elements of each feature scan parameter are employed in extracting the features of a particular character. Initially, the START (S) and the LENGTH (L) parameters must be adjusted or denormalized to conform with the boundaries (size and location) of the particular character in the matrix. The TN and R parameters do not have to be adjusted.

To carry out the adjustment or denormalization for the character boundaries, the character bit-matrix memory 64 is first sequentially interrogated from either the top down or from the bottom up. In this example, the matrix memory 64 will be interrogated from the top down (i.e., row 63 to row0).Control unit 50 provides the sequence of y address signals on section 66y of cable 66. The y address is initially set to row number sixty-three and is then decremented. As each sixty-four bit row is accessed it is transferred via cables 68 and 70 to "Or" network 72 which is a sixty-four input OR circuit whose output, BB, on line 74-2 of cable 74 takes the value "1" when any inputs are "1" (black) bits. The output BB of network 72 is connected back to control unit 50 via cable 74 to provide a status signal. Thus, the first time a black bit is detected at any one or more of the inputs to the OR network 72 as the matrix memory 64 is decremented, the output BB of the OR network will take on the value of "1", indicating that the top boundary of the character in matrix memory 64 has been located. The output of "Or" network72 informs control unit 50 of this occurrence and the particular y-address of the row for the top boundary of the character in matrix memory 64 is specified. Control unit 50 enters this information (y-address) in the system memory unit 56 (FIG. 2).

After the first "1" output from "Or" network 72 (which specifies the top boundary of the character) is obtained, the y-address of the matrix memory 64 continues to decrement under the control of control unit 50 and "Or" network 72 continues to produce a "1" output signal. When a row of matrix memory 64 is encountered which contains all white bits, this condition is indicated by the output BB of "Or" network 72 producing a "0" (white) signal on line 74-2. This condition also specifies the bottom boundary of the character in matrix memory 64 and the condition is indicated to control unit 50 via the "0" signal on cable 74. Control unit 50 then enters the y-address of this row as the bottom boundary of the character into the system memory unit 56 (FIG. 2) so that the y-address for the upper and lower boundaries of the character in matrix memory 64 are known. From this will be established the character height and any vertical offset that may exist between the centers of the character matrix 64 and the character "box". A description of the determination of the character width will now be discussed.

At the same time that matrix memory 64 is decremented and the sixty-four bits for each row are conveyed to "Or" network 72, the contents of each y-addressed row are transferred (after initial clearing of the character-width register 78 via cable 68) to character-width register 78. Character-width register 78 is a sixty-four bit storage register which stores the bits from each row of matrix memory 64 as the matrix memory 64 is decremented. Each succeeding row from matrix memory 64 is read on over the previously stored row in character-width register 78. A storage cell, once set to the "1" state, can only be reset to the "0" state by means of the "CLEAR" line of cable 66. The resultant effect of this procedure, after all sixty-four rows have been read into character-width register 78 is to compress all the bits of the character stored in matrix memory 64 in the vertical direction into a single composite row wherein the extreme left and right position black bits of the character are stored as the most left and most right position black bits in the register positions of character-width register 78.

After matrix memory 64 has been fully decremented in the y direction, Output Enable 1 of cable 66 is set to zero thereby effectively disconnecting the output of said memory from cable 68. The single composite row of data stored in character-width register 78 is asserted on cable 80 via a "1" signal on Output Enable 2 of cable 66 and thereby said data appear at the input to Bit-Multiplexer 76.

Figures 6, 6A:
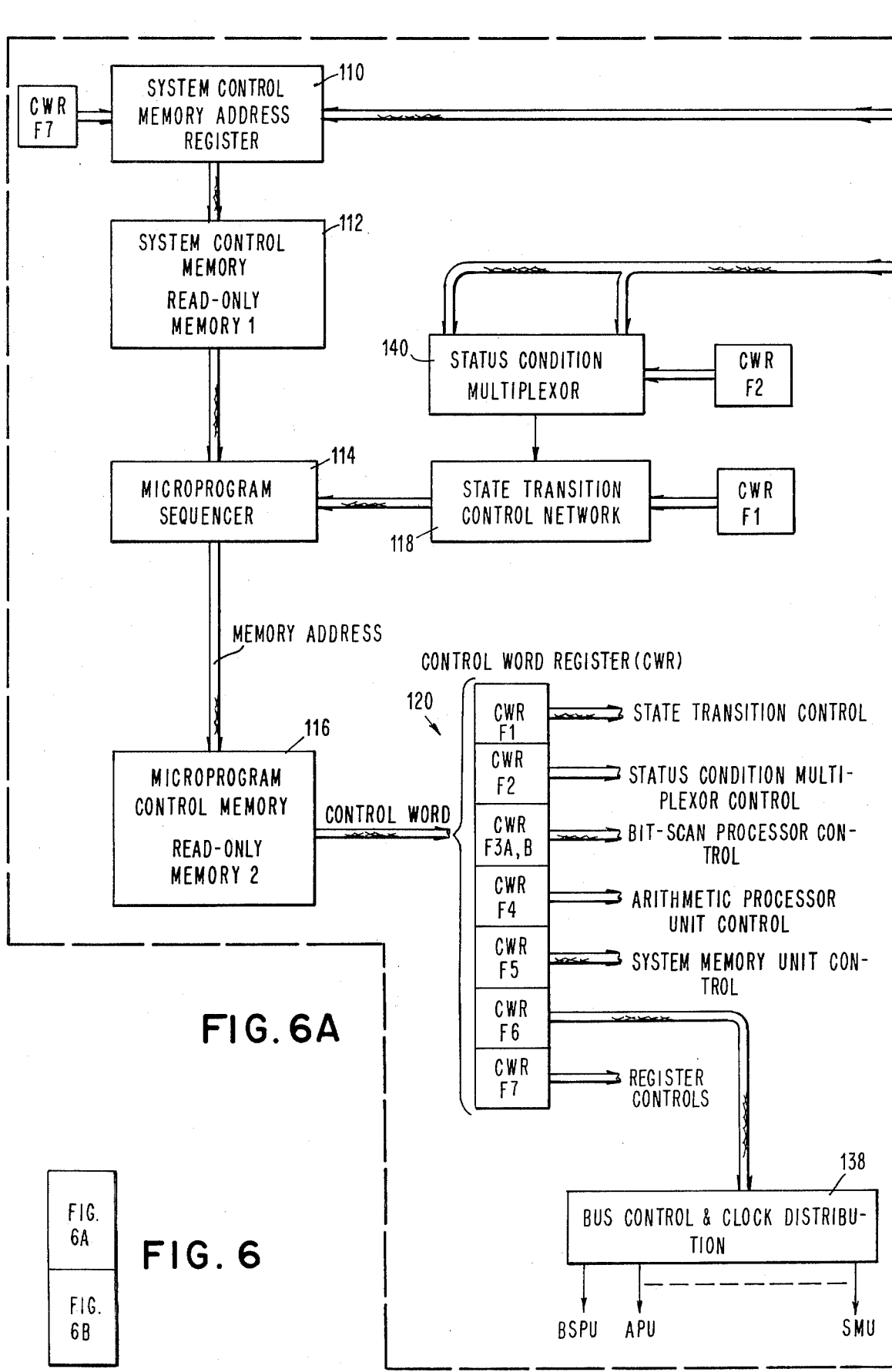
Figures 7, 7B:
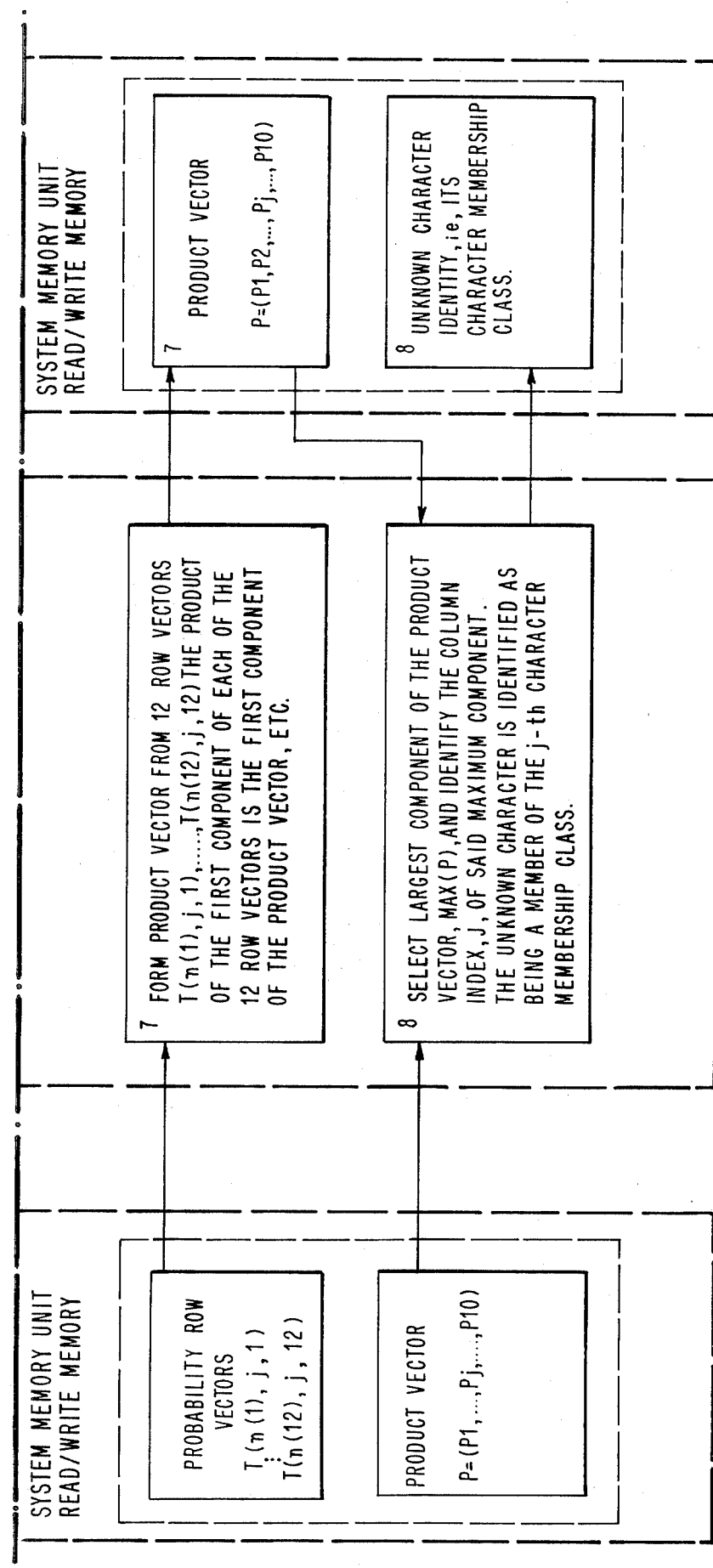
Figures 8A, 8B:
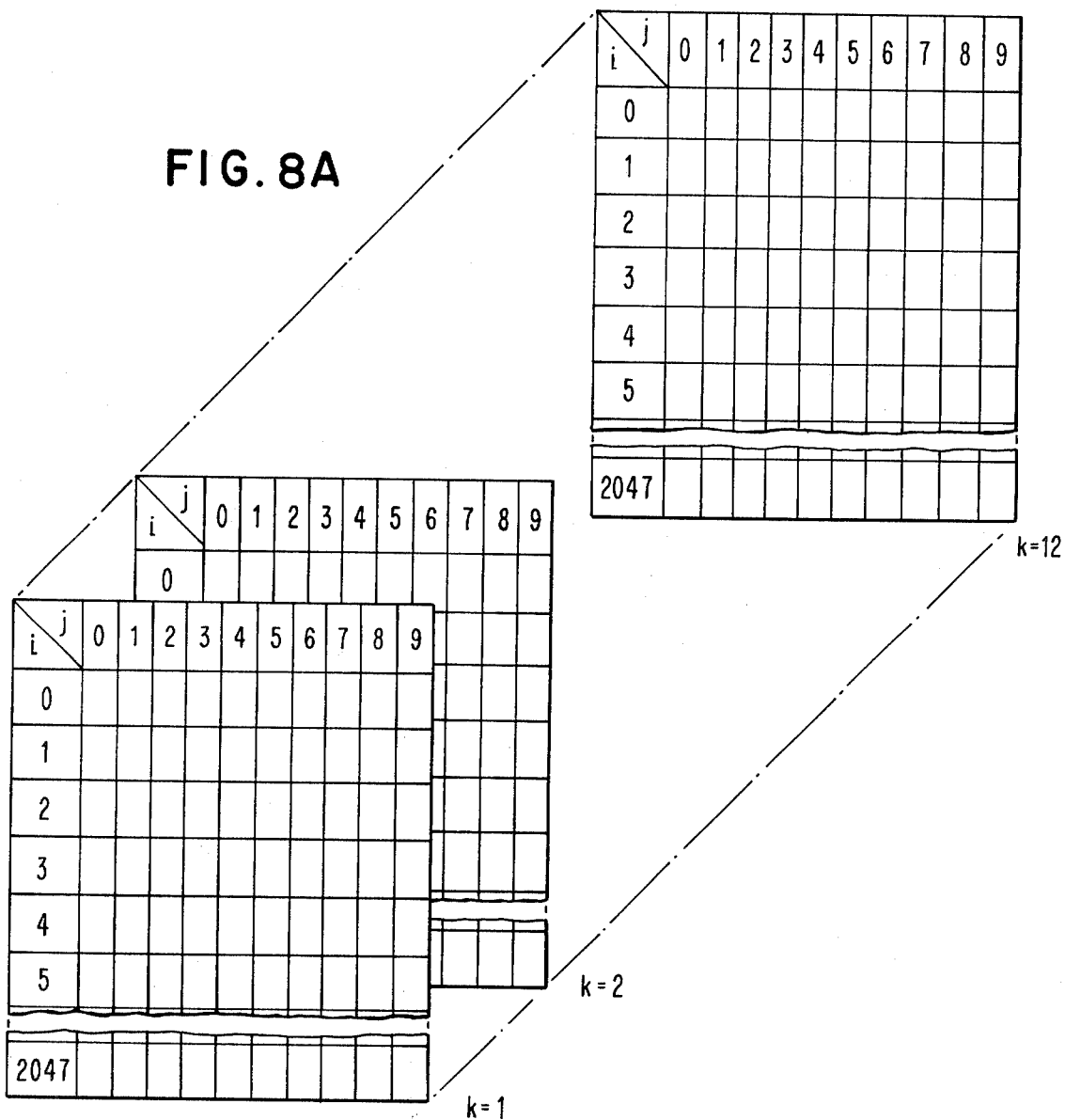
FIGS. 8A and 8B illustrate the statistical tables employed in the operation of the character recognition system of the present invention.
Figure 9:
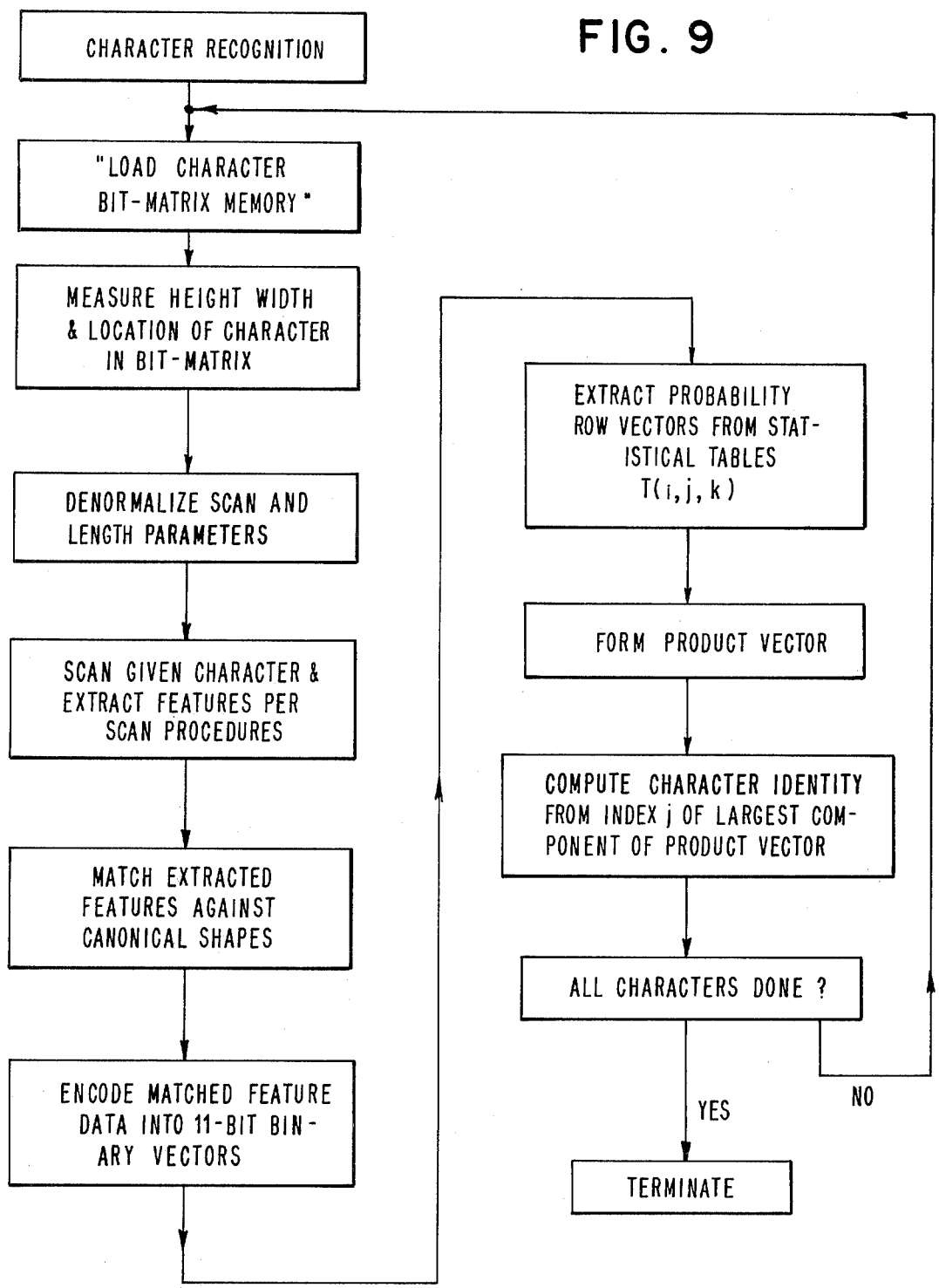
FIG. 9 is a function flow chart of the sequence of the method of system operation of the character recognition system of the present invention.

Once the single row of data from character-width register 78 is present at the input to bit-multiplexer 76, it is interrogated by a sequence of x-addresses from $x=0$ on up (i.e., from the left) via cable 66x. The occurrence of the first black bit indicated by a "1" signal or B(x,y) of cable 74, designates the extreme left side of the character and causes control unit 50 to store the current x-address in system memory 56 from field 3 of control word register 120 (FIG. 6). Bit-multiplexer 76 is then examined from the right side by x-addresses which are decremented from sixty-three. When the first black bit is encountered during decrementation, this specifies the extreme right side of the character and the x-address of this bit is sent to system memory 56 from control unit 50. Control unit 50 thus sends the left- and right-bit addresses (from which the character width is derived) to the system memory unit 56 (FIG. 2). Thus, the character size and its relative position within the sixty-four by sixty-four matrix may now be determined from the upper-boundary y-address, lower-boundary y-address, left-boundary x-address and the right-boundary x-address stored in system memory unit 56.

Figure 4:
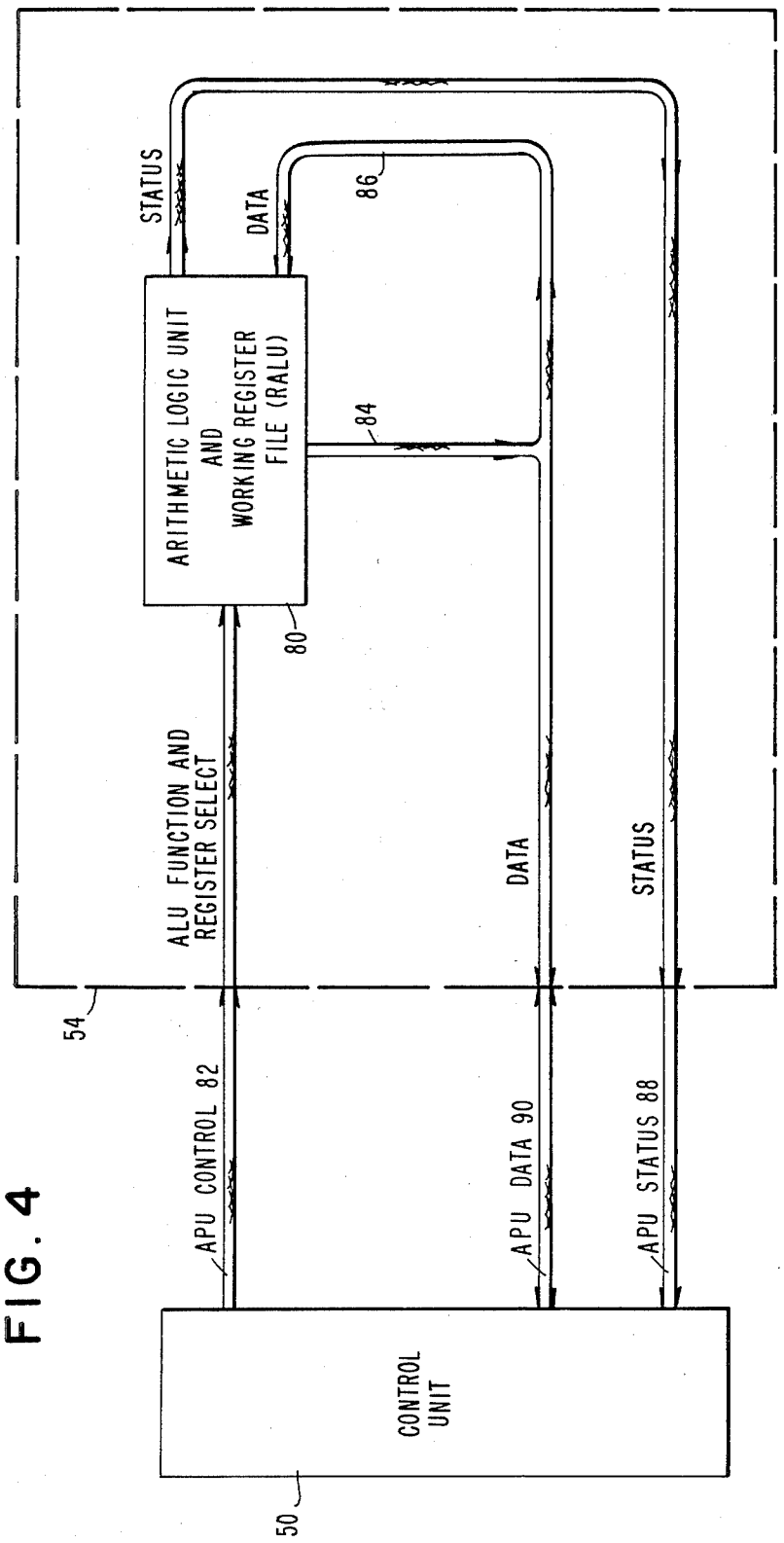
FIG. 4 is a schematic block diagram of the structure of the arithmetic processor unit of the character recognition system of the present invention.

FIG. 4 is a schematic block diagram of one embodiment of the structure for the arithmetic processor unit (APU) 54 previously illustrated and described relative to FIG. 2. The arithmetic processor unit 54 includes: arithmetic logic unit and working register file 80 which is connected to control unit 50 by means of APU control bus 82; data output bus 84, data input bus 86, both of which are connected to APU data bus 90; and, APU status bus 88.

Standard logic and arithmetic processing tasks such as addition, subtraction, multiplication, division, comparison, exponentation, et al, are carried out by the arithmetic processor unit 54 as required under direction of control unit 50. The particular processing function to be executed, the data sources for the processing function and destinations for the results are governed by the commands received from control unit 50 via APU control bus 82. These APU function and register select commands come from control word register 120 of control unit 50 which will be more fully described relative to FIGS. 6A and 6B.

More specifically, arithmetic-processing commands are received from a control word register field (CWRF4) of the control word register 120 of FIG. 6A and are coupled to the arithmetic processor unit 54 via the APU control bus 82 as shown in FIG. 4 and again in FIG. 6B. As previously stated, the logic and arithmetic processing operations include addition, subtraction, multiplication, division, comparison, exponentation, et al, and these operations are performed in various phases of system operation as they are needed such as in the determining of the character height and width and location within the character bit matrix, in the denormalization of the scan and length parameters accumulating scan arc-lengths during curve followings, computing complex inner products to determine which canonic shape best matches a given extracted feature, coding of the extracted and matched feature information, etc. Design details of the instructions set formats, form and formats of data words, operational sequences of micro instructions to perform required arithmetic functions, etc., are omitted since these are within the capabilities of one skilled in the design of the implementation of the arithmetic processor unit 80.

The data upon which the various arithmetic processing operations such as addition, subtraction, multiplication, etc. are carried out by arithmetic processor unit 80 are provided on bus 90 and data input bus 86 and the results of the arithmetic processing are removed from arithmetic processor unit 80 via data output bus 84 and bus 90. The data are transferred to and from system memory unit (SMU) 56 under the direction of signal commands from control unit 50. Thus, in FIGS. 6A and 6B, it is seen that the APU data bus 90 of arithmetic processor unit 54 is connected to the system memory unit (SMU) 56 which is addressed by the system memory unit address register 142 which is in turn controlled by signals from field (CWRF7) of the control word register 120.

The third connection between the arithmetic processor unit 54 and control unit 50 is the APU status bus 88 which is connected to the status condition multiplexor 140 (FIG. 6A) of the control unit 50. Status condition multiplexor 140 is controlled by signals from field (CWRF2) of control word register 120.

In summary, the arithmetic processor unit 54 depicted in FIG. 4 is the unit which carries out the required logical and mathematical functions required throughout the system operation. The arithmetic processor unit 54 operates under the command of control unit 50 and obtains and returns the required data from the system memory unit 56 under the control of signals from control unit 50.

Figure 5:
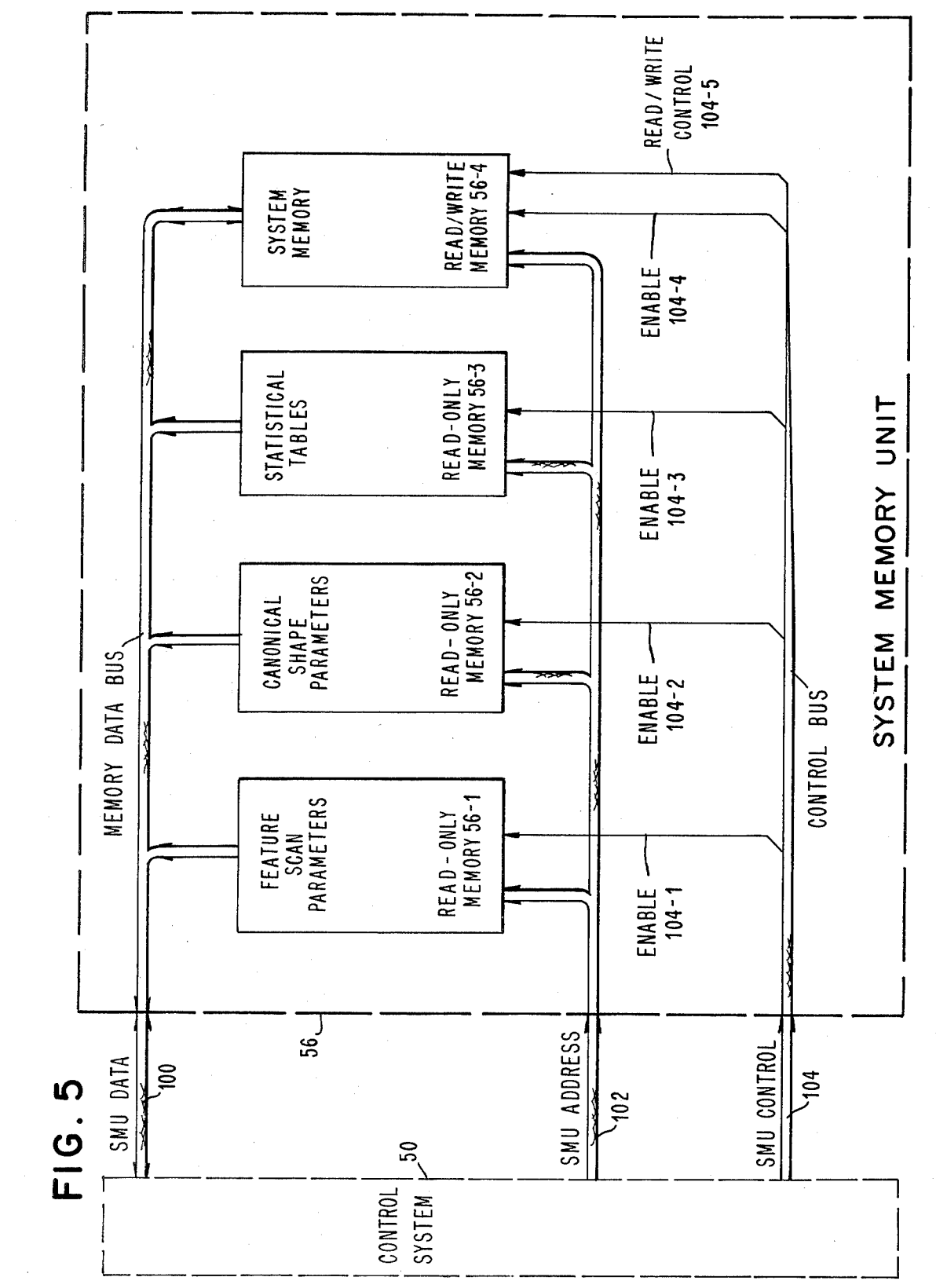

FIG. 5 depicts a schematic block diagram of one embodiment of the structure for the system memory unit (SMU) 56. The system memory unit 56 is divided into four sub-units and which includes read-only memory 56-1 in which is stored the feature scan parameters provided by the "Select and Store Feature Scan Parameters" function 10-2 described relative to FIG. 1. Read-only memory 56-2 contains canonical shape parameter information provided by the "Select and Store Canonic Shape Parameters" function 10-3 described relative to FIG. 1. Read-only memory 56-3 contains statistical tables created by the "Build Statistical Table" function 20-2 of FIG. 1 and read-write memory 56-4 contains the general system memory space.

Memory data transfers between the system memory unit 56 and the control unit 50 take place over bidirectional SMU data bus 100. SMU address bus 102 from control unit 50 is connected to the address input of each of the four memory sub-units within system memory unit 56. Control of the system memory unit 56 under direction of control unit 50 is accomplished by means of appropriate commands fed to the system memory unit via SMU control bus 104. SMU control bus 104 includes individual enable lines for each of the four memory sub-units (enable 104-1 through enable 104-4). Mode control of read-write memory 56-4 is determined by read-write control line 104-5.

In summary, the system memory unit 56 depicted in FIG. 5 is a system storage means which may be embodied in conventional memory hardware. The SMU 56 is divided into four sub-units: three read-only memory portions 56-1, 56-2 and 56-3 which serve to provide storage for the feature scan parameters, the canonic shape parameters and the statistical tables, and a read-write memory portion 56-4 which is the general memory space for other data employed during the system operation such as the outputs from the arithmetic processor unit 54. The system memory unit 56 is connected to and operates under the supervision of control unit 50 via the aforesaid busses 100, 102 and 104.

FIGS. 6A and 6B, when combined as shown in FIG. 6, illustrate a schematic block diagram of one embodiment of a structure for control unit 50. Control unit 50 is connected to and controls the operations of the functions of the bit-scan processor unit 52, the arithmetic processor unit 54 and the system memory unit 56.

The control unit includes the System Control Memory Address Register (SCMAR) 110, System Control Memory (SCM) 112 a read-only memory in which is stored the system control program, Microprogram Sequencer (MS) 114, a read-only 116 containing the Microprogram Control Memory (MCM) 116, State Transition Control Network (STCN) 118, Control Word Register (CWR) 120, Bus Control and Clock Distribution network(BCCD) 138, Status Condition Multiplexer (SCMPX) 140, System Memory Unit Address Register (SMUAR) 142, Data Bus 144 and Status Bus 146.

The individual control field designations in control word register 120 are as follows: F1, which is allocated for state transition control; F2, which is allocated for status condition multiplexer control; Fe, which is allocated for bit scan processor control; F4, which is allocated for arithmetic processor unit control; F5, which is allocated for system memory unit control; F6, which is allocated for bus control and clock distribution; and field F7 is allocated for register controls.

Control Unit 50 is a read-only memory (ROM)-based microprogrammed digital control system that generates an ensemble of time-sequenced control waveforms on the output lines of Control Word Register 120 which are used to direct and coordinate the interrelated operations of the various hardware sub-units, e.g., Bit-Scan Processor Unit 52, et al, in performing specified system operations. These system operations are performed by executing appropriate sequences of system-level commands stored in System Control Memory (SCM) 112 and addressed by the System Control Memory Address Register (SCMAR) 110.

Execution of a system-level command begins by fetching said command from SCM 112 and loading it into MS 114 which utilizes said command as an address pointer into MCM 116 to fetch the first of a sequence of binary-coded control words that will be successively loaded into CWR 120, thereby generating time-sequenced control waveforms at the various bit-positions within CWR 120 to control interrelated operations within hardware sub-units as required to carry out said system-level command.

In the following paragraphs a brief description is given of how the control-information contents of SCM 112 and MCM 116 are established in the process of implementing the Character Recognition System.

System Control Memory 112 is a read-only memory in which is stored the system-level control information comprised of sequences of binary-coded system-level commands, chosen from a suitably defined set of such commands. These sequences of system-level commands are appropriately related to the collection of algorithms or procedures previously described. The specification of a suitable system-level command set, their assigned binary encodings, and said appropriately related sequences thereof is within the capabilities of one skilled in the design of ROM-based microprogrammed digital control systems. Several references describing the design of ROM-based microprogrammed digital systems are given as follows:

1. "Designing Logic Systems Using State Machines," C. R. Clare, McGraw-Hill, New York, N.Y., 1973
2. "Digital Design with Standard MSI and LSI," T. R. Blakeslee, Wiley-Interscience, New York, N.Y., 1975
3. "Microprogramming Simplifies Control System Design," R. Kenny, Computer Design, 14 (2), 96 (1975)
4. "Microprogramming: A General Design Tool," R. Jaeger, Computer Design, 13(8), 150 (1974)
5. "A Primer on Bit-Slice Processors," J. Nemec et al, Electronic Design, 25(3), 52 (1977)

In the next step, each system-level command in the specified command set is examined from an operational viewpoint to determine the time-sequenced actions required of the hardware sub-units in order to execute or carry out said system-level command. Thus, each system-level command is analyzed and described in terms of a corresponding sequence of interrelated elemental hardware operations that are to take place within various hardware sub-units.

Following this description, each sequence of interrelated elemental hardware operations, corresponding to a given system-level command, that takes place within a given hardware sub-unit is analyzed to define the requisite time-sequenced control waveforms needed as control inputs to said hardware sub-unit to elicit said sequence of interrelated elemental hardware operations therefrom. This procedure is applied, in turn, for each of the hardware sub-units to create a complete description of the required ensemble of control waveforms.

Each control waveform so defined establishes a sequence of time-dependent signal values required as part of the control input from CWR 120 to a hardware sub-unit. From the sequence of signal values, comprised of binary digit (bit) values of "0" and "1", in turn is derived the sequence of bit values and associated time durations required at a given particular output bit-position of CWR 120. The collection of all such information, for all the bit-positions within CWR 120, provides the basis on which to synthesize the binary coded control words that are to be loaded into permanent (ROM) storage, provided by MCM 116.

The foregoing procedures described a method for deriving the control information content for the two control ROM's in CU 50, viz., for deriving binary-coded system-level command sequences to be permanently stored in SCM 112, and corresponding binary-coded control words for permanent storage in MCM 116.

The remainder of CU 50 is implemented using industry-standard microprogrammable bit-slice LSI digital circuits such as the 2900-series of devices from Advanced Micro Devices (AMD), Inc., the 9400-series from Fairchild Semiconductor, Inc., the 3000-series from Intel, Inc., the 74S400-series from Texas Instruments (T.I.), Inc., etc., and MSI circuits such as the 7400-series TTL circuits available from many sources.

Listed below are some specific examples of MSI and LSI devices that may be used for implementation of various portions of CU 50. System Control Memory 112 and Mircoprogram Control Memory 116: programmable ROMs (PROMs) such as the 82S147 and 82S191 from Signetics, Inc.

Microprogram Sequencer 114: Am2909's available from AMD, Inc., or 74S482's available from T.I., Inc. State Transition Control Network 118: 82S123 PROMs from Signetics, Inc. Status Condition Multiplexer 140: AM2922's from AMD, Inc. Control Word Register 120: AM2918's from AMD, Inc. Bus Control and Clock Distribution 138: 82S123 PROMs from Signetics, Inc., and 74112, 74124 and 74161 MSI circuits, et al, available from AMD, T.I., Signetics, etc.

The following section contains a detailed description of the flow of control within CU 50.

Microprogram Control Memory (MCM) 116 is a read-only memory that contains bit patterns, organized as control woords, which are addressed by the Microprogram Sequencer (MS) 114. By addressing appropriate locations in MCM 116 in a suitable sequence, the required time-sequenced control waveforms will be emitted to the hardware sub-units from CWR 120.

Based on the current system-level command word present at the data output port of SCM 112, MS 114 will point to, i.e., issue the address of, the initial control word required at the output of CWR 120. This control word is loaded from MCM 116 into CWR 120 and initiates some elemental operation(s) to begin the sequence of interrelated hardware actions required of the hardware sub-unit(s) in order to begin carrying out said current system-level command. Selection of the address of the next control word to be accessed from MCM 116 is determined by control information stored in field 1 (F1) of CWR 120. This state transition control (STC) information defines how the address of the next control word to be accessed from MCM 116 will be determined and provides the basis for Control Unit 50 to perform useful functions by progressing through prescribed state sequences in a controlled manner. State Transition Control Network (STCN) 118 decodes the STC information residing in F1 of the current control word in CWR 120 and provides control and data inputs to MS 114. When the address of the next control word to be accessed from MCM 116 is that of the next memory location in MCM 116, the MS 114 is instructed by STCN 118 to increment the current address pointer which resides in a register within MS 114. In the case where the state transition of CU 50 is conditional, i.e., is dependent upon a status condition in one of the hardware sub-units, appropriate STC information in CWR F1 commands STCN 118 to utilize the information from Status Condition Multiplexer (SCMPX) 140 in generating the control input to MS 114. CWRF2 control input to SCMPX 140 defines which of the status condition feedback lines shall be coupled to STCN 118 and specifies if logic inversion of that status signal is required. In this manner the selection of the next control word in MCM 116 can be made to depend on the status of signals within hardware sub-units so that, for example, if a selected status condition is true the MS 114 will increment the memory address pointer and if said condition is found to be false, STCN 118 will load a branch address into the memory address pointer (in MS 114) from F1 of the current control word residing in CWR 120. Thus, the selection of the next control word in MCM 116 is made to depend upon the status of a condition within a hardware sub-unit and thereby provides the ability for CU 50 to test status conditions and to branch appropriately within the microprogram memory space.

At the completion of a sequence of interrelated elemental hardware operations corresponding to a system-level command, control information contained in F1 of the final control word related to said sequence residing in CWR 120 is decoded by STCN 118 to generate appropriate control input to MS 114 to cause it to read the next system-level command present at the output port of System Control Memory 112, said next system-level command having been updated after the MS 114 read the previous system-level command, viz., the system-level command just executed. MX 114 interprets the bit pattern of the new system-level command to determine the location, in MCM 116, of the first control word corresponding thereto and required to begin execution of said new system-level command. Bit pattern interpretation is accomplished by means of a read-only memory or programmed logic array, internal to MS 114, which maps the binary pattern of a given system-level command into the appropriate starting address for the corresponding first control word which is then loaded into CWR 120. Sequential control of the various phases within the process of executing system-level commands is the task assigned to the Bus Control and Clock Distribution network (BCCD) 138 which emits appropriately timed control signals to various parts of the system. Thus, for example, after MCM 116 receives the next address from MS 114, an appropriate time delay is introduced prior to BCCDS 138 emitting a load signal to CWR 120. This is done to allow for the expiration of a time period equal to the memory address access time of MCM 116 to permit the control word fetched from MCM 116 to stabilize at the data output port thereof.

To summarize, F1 and F2 of CWR 120 in conjunction with STCN 118, SCMPX 140, SCM 112 and MS 114 generate the address of the next control word to be fetched from MCM 116 for loading into CWR 120. MCM 116 stores binary-coded control words, sequences of which are emitted to CWR 120 to generate the ensemble of control waveforms required to manage the operation of system hardware resources. SCM 112 stores binary-coded system-level commands, sequences of which correspond to the algorithms underlying system operations. Addresses for SCM 112 are supplied from SCMAR 110 under control of F7 of CWR 120. Fields F3A, F4 and F5 of CWR 120 provide control waveforms to the BSPU 52, APU54 and SMU 56, respectively. F6 of CWR 120 provides control inputs to BCCD 138 to effect appropriate synchronization of interrelated hardware operations. F7 of CWR 120 also provides control inputs to SMUAR 142 (in addition to SCMAR 110) which supplies addressing for the memory sub-units, viz., ROMs 56-1, 56-2, 56-3 and Read/Write Memory 56-4 located in SMU 56.

To illustrate the operation of the microprogrammed digital control system CU 50, consider a system-level command for scanning the Character Bit-Matrix Memory (CBMM) 64 to locate the top boundary of an unknown character stored therein. The command may be carried out by the following sequence of hardware operations. It should be noted that there are opportunities for parallel or concurrent operational steps in the listing below but that the degree to which such opportunities are exploited depends upon the decisions of the system designer in evaluating the trade-offs between system cost, speed and complexity.

| Step | OPERATION |
|---|---|
| 1. | Set Output Enable 1 66-2 true via F3A of CWR 120. |
| 2. | Set Read/Write Control 66-1 for READ operation via F3A of CWR 120. |
| 3. | Set SCMPX 140, via F2 of CWR 120, to address of line BB 74-2. |
| 4. | Set STCN 118, via F1 of CWR 120, to command MS 114 to branch to the starting address in MCM 116 of the next system-level command from SCM 112 if the input to STCN 118 from SCMPX 140 is true. |
| 5. | Set APU 54, via F4 of CWR 120, to store on command-when STCN 118 receives a true signal from SCMPX 140- the current Y-Address, via F3B of CWR 120, in a working register of RALU 80 in APU 54 allocated for temporarily storing the upper boundary address of the unknown character in CBMM 64. |
| 6. | Set Y-Address 66y to 63 via F3A of CWR 120 and decrement Y-Address once each clock cycle. |

The "locate top boundary" system-level command is received by MS 114 from the data output port of SCM 112 and is intercepted by an internal ROM look-up table to produce the address of the first control word in MCM 116. CBMM 64 is commanded by F3A of CWR 120 to enable the output of CBMM 64 and to place it in the read mode. A data path from outline line BB 74-2 of the 64-to-1 OR network 72 to STCN 118 is established by appropriate control information in F1 of CWR 120 fed to SCMPX 140. As a sequence of descending values of Y-Addresses are fed to CBMM64, successive words are red out non-destructively and appear at the input port of OR network 72. When a word appears that has at least one black bit therein, line BB 74-2 will take on the value "1" and this signal is coupled through BSPU Status bus 74 to SCMPX 140 and is transferred to STCN 118 and further passed on to MS 114 wherein it results in the selection of a next address for MCM 116 containing the control word which, when loaded into CWR 120, will initiate the storage of the current Y-Address in an appropriately allocated register in RALU 80 contained in APU 54 via F3B of CWR 120 and APU Data bus 90. Said control word will contain control information in F1 which will cause MS 114 to accept the next system-level command from the data output port of SCM 112 and interpret it to produce the next memory address of MCM 116.

INDUSTRIAL APPLICABILITY

The system and method are effective for automatically recognizing or identifying characters in an environment where the separate characters may vary slightly in shape or form in each occurrence, such as in handwritten characters produced by a large number of different writers. Thus, the system and method will be very useful in applications where a large volume of handwritten documents written by a large number of a class of people must be processed. Examples of such applications are military records, social security records, motor vehicle records, educational and other statistical testing and the like. Once the system has been set up and trained using training characters from the selected application records, the system is then able to process large volumes of documents thereafter.

Having thus described our invention, what we claim as new and desire to secure by Letters Patent is:

1. In an automatic character recognition system for identifying an unknown character wherein said unknown character is one of a class of a plurality of known characters, a scanning and training structure including:

means for storing a binary indicia a plurality of separate segments of character shapes, said separate segments being conformable to segments included within the shapes of said characters within said plurality of known characters, said binary encoded separate segments being referred to as canonic shapes and each being identified in said storage means by a binary encoded shape index number, means for processing and manifesting a first known character from said character class in a digital matrix format of stored binary indicia, means connected to said processing and manifesting means for digitally scanning said stored first known character indicia using a first set of selected scan parameters, said selected scan parameters designating a specific start position, scan length, scan binary indicia transition and direction for said scanning function, said digital scanning function producing a first binary encoded path vector in the form of a multi-bit binary word including the starting coordinates of said scan and a plurality of further binary coordinates of said known character along the selected length of said scan, means connected to said digital scanning and encoding means and to said binary indicia storing means for performing the complex inner product function of said binary encoded path vector and each of said stored canonic shapes to produce a plurality of complex numbers encoded in binary form, one for each complex inner product performed with each canonic shape, each of said binary encoded complex inner product numbers including a magnitude value representative of the similarity between said binary encoded path vector and each of said canonic shapes, and an angle value representative of the angular offset of the encoded path vector relative to each of said canonic shapes, means connected to said complex inner product function means for determining the magnitude of each of said encoded complex inner product number and selecting the largest magnitude number and recording the shape index of the canonic shape which produced said largest magnitude complex inner product number, means connected to said magnitude determining means for encoding at least said recorded shape index and said angle value within an N bit vector, at least a first storage plane means including a separate storage column for each of different one of said characters in said class of a plurality of characters and $2^N$ storage rows for each different one of possible N bit vectors, and means connected to said N bit vector encoding means and said first storage plane means of entering a first storage indicia into said at least first storage plane means at a discrete storage location corresponding to the column associated with said first known character and to the row associated with said encoded N bit vector associated with said recorded shape index and angle value.

2. In said automatic character recognition system according to claim 1, said processing and manifesting means including a character memory storage means for storing a character in a digital matrix format of horizontal and vertical binary storage elements and means for determining the boundaries of the character stored in said digital matrix, and wherein said digital scanning means includes a curve follower structure which operates in accordance with a selected scan parameter designating a specific start position at one of the sides of said horizontal and vertical digital matrix format and scans in one of said horizontal and vertical directions until a binary indicia of said stored character is detected, and follows the binary indicia of said stored character along the character for a character segment length designated by said selected scan parameter to produce said binary encoded path vector in the form of a multi-bit binary word.

3. In an automatic character recognition system according to claim 1, a scanning and training structure further including a plurality of k of said storage plane means,
wherein said digital scanning means repeatedly scans said first known character indicia k times, each of said k scans being performed using a different set of selected scan parameters for producing k binary encoded path vectors in the form of k separate milti-bit binary words,
wherein said complex inner product function performing means performs the complex inner product function of each of said k binary encoded path vectors and each of said stored canonic shapes to produce k separate pluralities of complex numbers encoded in binary form, each one of said k separate pluralities of encoded complex numbers including an encoded complex number for each complex inner product performed with each canonic shape and a separate different one of said k binary encoded path vectors, each of said binary encoded complex inner product numbers including a magnitude value representative of the similarity between its associated one of said k binary encoded path vectors and each of said canonic shapes, and an angle value representative of the angular offset of its associated one of said k binary encoded path vectors relative to each of said canonic shapes,
wherein said magnitude determining and recording means and said shape index and angle value encoding means provide a plurality of k separate of N bit vectors, one for each of said k different scans, said k separate N bit vectors being representative of the shape index and angle value of the largest magnitude inner complex number produced by each of said k scan path vectors and said plurality of canonic shapes,
and wherein said storage indicia entering means enters a separate storage indicia into each of said k storage planes at discrete storage locations corresponding to the column associated with said first known character and to the row associated with each of said separate encoded N bit vectors associated with said recorded shape index and angle value produced relative to each of said separate k scans using a different set of selected scan parameters.

4. In an automatic character recognition system according to claim 3, a scanning and training structure wherein said manifesting and processing means processes and manifests a plurality of different known characters from said character class in sequence and wherein said operation functions of said scanning and training structure are repeated for each of said different known characters of said plurality to produce storage indicia in each of said k storage planes at discrete storage locations corresponding to the columns associated with of said plurality of different known characters and to the rows associated with said recorded shape indicies and angle values produced relative to each of said separate k scans using different sets of selected scan parameters for said plurality of different known characters.

5. An automatic character recognition system including a scanning and training structure according to claim 4 wherein said plurality of different known characters processed and manifested are handwritten alphanumeric characters from a character class of said handwritten alphanumeric characters.

6. In an automatic character recognition system according to claim 4, means for identifying an unknown character of said class of a plurality of known characters after said scanning and training operation, including:
means for entering said unknown character into said processing and manifesting means for manifesting said unknown character in a digital matrix format of stored battery indicia,
means for repeatedly digitally scanning said stored unknown character indicia k separate times using a k different sets of selected scan parameters one for each separate scan, each of said selected scan parameters designating a specific start position, scan length, binary indicia transition and direction for said scanning function, said digital scanning function producing a k binary encoded path vectors in the form of k multi-bit binary words including the starting coordinates of each of said scans and a plurality of further binary coordinates of said unknown character along said selected lengths of each of said scans,
wherein said complex inner product function performing means performs the complex inner product function of each of said k binary encoded path vectors produced by scanning said unknown character and each of said stored canonic shapes to produce k separate pluralities of complex numbers encoded in binary form, each one of said k separate pluralities of encoded complex numbers including an encoded complex number for each complex inner product performed with each canonic shape and a separate different one of said k binary encoded path vectors, each of said binary encoded complex inner product numbers including a magnitude value representative of the similarity between its associated one of said k binary encoded path vectors and each of said canonic shapes, and an angle value representative of the angular offset of its associated one of said k binary encoded path vectors relative to each of said canonic shapes,
wherein said magnitude determining and recording means and said shape index and angle value encoding means provide a plurality of k separate N bit vectors, one for each of said k different scans of said unknown character, said k separate N bit vectors being representative of the shape index and angle value of the largest magnitude inner complex number produced by each of said k scan path vectors and said plurality of canonic shapes, and
wherein said first of said k separate N bit vectors specifies a specific row of the first one of said k storage planes, said second of said N bit vectors specifies a specific row of the second one of said k storage planes, and so on to said kth N bit vector which specifies a specific row of the kth one of said storage planes, means for obtaining and storing the contents of each of said specified k rows, one from each of said k storage planes, specified by each of said k-N bit vectors, means for performing the product vector of the value of the first column location contents of each of said specified k rows, and for the values of each of the succeeding column locations of each of the other specified k rows to produce a plurality of products vector components, one for each column location of said rows, means for determining and selecting the largest one of said components of said product vector and storing the column location of said largest product vector component, and means for indicating the known character associated with said one selected column location associated with said largest product vector component, said unknown character being recognized as said known character.

7. In a character recognition method for identifying an unknown character wherein said unknown character is one of a class of a plurality of known characters, a plurality of scanning and training steps including:

the step of storing in binary indicia a plurality of separate segments of character shapes, said separate segments being conformable to segments included within the shapes of said characters within said plurality of known characters, said binary encoded separate segments being referred to as canonic shapes and each being identified in said storage means by a binary encoded shape index number, the steps of processing and manifesting a first known character from said character class in a digital matrix format of stored binary indicia, the step of digitally scanning said stored first known character indicia using a first set of selected scan parameters, said selected scan parameters designating a specific start position, scan length, binary indicia transition and direction for said scanning step, said digital scanning step producing a first binary encoded path vector in the form of a multi-bit binary word including the starting coordinates of said scan and a plurality of further binary coordinates of said known characters along the selected length of said scan, the step of performing the complex inner product function of said binary encoded path vector and each of said stored canonic shapes to produce a plurality of complex numbers encoded in binary form, one for each complex inner product performed with each canonic shape, each of said binary encoded complex inner product numbers including a magnitude value representative of the similarity between said binary encoded path vector and each of said canonic shapes, and an angle value representative of the angular offset of the encoded path vector relative to each of said canonic shapes, the steps of determining the magnitude of each of said encoded complex under product number and selecting the largest magnitude number and recording the shape index of the canonic shape which produced said largest magnitude complex inner product number, the step of encoding at least said recorded shape index and said angle value within an N bit vector, the step of providing at least a first storage plane means including a separate storage column for each of different one of said characters in said class of a plurality of characters and $2^N$ storage rows for each different one of possible N bit vectors, and the step of entering a first storage indicia into said at least first storage plane means at a discrete storage location corresponding to the column associated with said first known character and to the row associated with said encoded N bit vector associated with said recorded shape index and angle value.

8. A character recognition method according to claim 7, including said plurality of scanning and training steps, wherein said step of providing at least a first storage plane means includes the providing of a plurality of k of said storage plane means, wherein said step of digital scanning includes the steps or repeatedly scanning said first known character indicia k times, each of said k scans being performed using a different set of selected scan parameters for producing k binary encoded path vectors in the form of k separate multi-bit binary words, wherein said step of performing said complex inner product function includes the steps of performing the complex inner product function of each of said k binary encoded path vectors and each of said stored canonic shapes to produce k separate plurality of complex numbers encoded in binary form, each one of said k separate plurality of encoded complex numbers including an encoded complex number for each complex inner product performed with each canonic shape and a separate different one of said k binary encoded path vectors, each of said binary encoded complex inner product numbers including a magnitude value representative of the similarity between its associated one of said k binary encoded path vectors and each of said canonic shapes, and an angle value representative of the angular offset of its associated one of said k binary encoded path vectors relative to each of said canonic shapes, wherein said steps of determining and recording said magnitude and encoding said shape index and angle value includes the steps of providing of k separate N bit vectors, one for each of said k different scans, said k separate N bit being representative of the shape index and angle value of the largest magnitude inner complex number produced by each of said k scan path vectors and said plurality of canonic shapes, and wherein said step of entering storage indicia includes the steps of entering a separate storage indicia into each of said k storage planes at discrete storage locations corresponding to the column associated with said first known character and to the row associated with each of said separate encoded N bit vectors associated with said recorded shape index and angle value produced relative to each of said separate k scans using a different set of selected scan parameters.

9. A character recognition method according to claim 8 including said plurality of scanning and training steps wherein said manifesting and processing step includes the steps of processing and manifesting a plurality of different known characters from said character class in sequence and wherein said plurality of said scanning and training steps are repeated for each of said different known characters of said plurality to produce storage indicia in each of said k storage planes at discrete storage locations corresponding to the columns associated with of said plurality of different known characters and to the rows associated with said recorded shape indicies and angle values produced relative to each of said separate k scans using different sets of selected scan parameters for said plurality of different known characters.

10. A character recognition method according to claim 9, further including steps for identifying an unknown character of said class of a plurality of known characters after said plurality of scanning and training steps are performed, including:

the steps of processing and manifesting said unknown character in a digital matrix format of stored binary indicia, the steps of repeatedly digitally scanning said stored unknown character indicia k separate using a k different sets of selected scan parameters one for each separate scan, each of said selected scan parameters designating a specific start position, scan length, binary indicia transition and direction for said scanning function, said digital scanning function producing a k binary encoded path vectors in the form of k multi-bit binary words including the starting coordinates of each of said scans and a plurality of further binary coordinates of said unknown character along said selected lengths of each of said scans, the steps of performing the complex inner product function of each of said k binary encoded path vectors produced by scanning said unknown character and each of said stored canonic shapes to produce k separate pluralities of complex numbers encoded in binary form, each one of said k separate pluralities of encoded complex numbers including an encoded complex number for each complex inner product performed with each canonic shape and a separate different one of said k binary encoded path vectors, each of said binary encoded complex inner product numbers including a magnitude value representative of the similarity between its associated one of said k binary encoded path vectors and each of said coanonic shapes, and an angle value representative of the angular offset of its associated one of said k binary encoded path vectors relative to each of said canonic shapes, wherein said magnitude determining and recording steps and said shape index and angle value encoding steps are performed on each of said k separate pluralities of complex numbers to provide a plurality of k separate N bit vectors, one for each of said k different scans of said unknown character, said k separate N bit vectors being representative of the shape index and angle value of the largest magnitude inner complex number produced by each of said k scan path vectors and said plurality of canoic shapes, and wherein said first of said k separate N bit vectors produced by said determining, recording and encoding steps specifies a specific row of the first one of said k storage planes, said second of said N bit vectors specifies a specific row of the second one of said k storage planes, and so on to said kth N bit vector which specifies a specific row of the kth one of said storage planes, the step of obtaining and storing the contents of each of said specified k rows, one from each of said k storage planes, specified by each of said k-N bit vectors, the steps of performing the product vector of the value of the first column location contents of each of said specified k rows, and for the values of each of the succeeding column locations of each of the other specified k rows to produce a plurality of products vector components, one for each column location of said rows, the steps of determining and selecting the largest one of said components of said product vector and storing the column location of said largest product vector component, and the step of indicating the known character associated with said one selected column location associated with said largest product vector component, said character being recognized as said known character.

* * * * *

UNITED STATES PATENT AND TRADEMARK OFFICE
CERTIFICATE OF CORRECTION

PATENT NO. : 4,177,448
DATED : December 4, 1979
INVENTOR(S) : R. K. Brayton

It is certified that error appears in the above—identified patent and that said Letters Patent is hereby corrected as shown below:

| | |
|---|---|
| Column 4, line 2, | after "number" insert --TN) the direction of rotation of the scan as the curve is-- |
| Column 4, line 63, | before "an index" insert --is-- |
| Column 13, line 21, | delete "Fe" and substitue therefor --F3-- |
| Column 16, line 1, | delete "MX" and substitute therefor --MS-- |
| Column 18, line 54, | delete "of" and substitute therefor --for-- |
| Column 20, line 21, | delete "battery" and substitue therefor --binary-- |
| Column 22, line 46 | after "providing" insert --a plurality-- |
| Column 23, line 20 | after "separate" insert --times-- |
| Column 24, line 2 | delete "coanonic" insert --canonic-- |
| Column 24, line 16 | delete "canoic" insert --canonic-- |

Signed and Sealed this

Fourteenth Day of December 1982

[SEAL]

Attest:

GERALD J. MOSSINGHOFF

Attesting Officer    Commissioner of Patents and Trademarks